United States Patent
Ito

(10) Patent No.: US 7,585,194 B2
(45) Date of Patent: Sep. 8, 2009

(54) CONDUCTOR PIN

(75) Inventor: Kunio Ito, Kanagawa (JP)

(73) Assignee: Wako Seiki Co., Ltd., Yokohama-Shi (JP)

( * ) Notice: Subject to any disclaimer, the term of this patent is extended or adjusted under 35 U.S.C. 154(b) by 0 days.

(21) Appl. No.: 11/569,152

(22) PCT Filed: May 17, 2005

(86) PCT No.: PCT/JP2005/009482

§ 371 (c)(1),
(2), (4) Date: Nov. 15, 2006

(87) PCT Pub. No.: WO2005/112200

PCT Pub. Date: Nov. 24, 2005

(65) Prior Publication Data

US 2007/0224889 A1    Sep. 27, 2007

(30) Foreign Application Priority Data

May 17, 2004    (JP)    ............................... 2004-146550

(51) Int. Cl.
H01R 13/24    (2006.01)
(52) U.S. Cl. .................................................... 439/824
(58) Field of Classification Search ................ 439/700, 439/826, 675, 218, 378, 265, 267, 268, 840, 439/841, 482, 63, 850, 851, 852, 853, 854, 439/862

See application file for complete search history.

(56) References Cited

U.S. PATENT DOCUMENTS

| 4,710,140 | A | * | 12/1987 | Frawley .................... 439/733.1 |
| 4,897,043 | A | | 1/1990 | Giringer |
| 5,641,315 | A | | 6/1997 | Swart |
| 6,059,595 | A | * | 5/2000 | Lacrouts-Cazenave ...... 439/289 |
| 6,656,631 | B2 | | 12/2003 | Zayatz et al. |
| 6,878,016 | B2 | * | 4/2005 | Wulff et al. ................. 439/700 |
| 6,923,688 | B1 | * | 8/2005 | Burson et al. ............... 439/675 |
| 2004/0077225 | A1 | | 4/2004 | Chun-Fu |

FOREIGN PATENT DOCUMENTS

| JP | 650260 | 7/1994 |
| JP | 08007949 | 1/1996 |
| JP | 2001283806 | 10/2001 |
| JP | 2002056831 | 2/2002 |
| JP | 2002093533 | 3/2002 |

* cited by examiner

Primary Examiner—Edwin A. Leon
(74) Attorney, Agent, or Firm—Lucas & Mercanti, LLP

(57) ABSTRACT

A conductor pin placed between one member and another member and contacting the both members to electrically connect the members to each other. The conductor pin includes a tubular outer pin portion formed by folding a conductive plate material for the outer pin portion, a tubular inner pin portion formed by folding a conductive plate material for the inner pin portion and inserted in the outer pin portion slidably in the axial direction of the outer pin portion, and a conductive spring disposed in the outer pin portion and inserted in the inner pin portion to urge the inner pin portion in a direction in which the inner pin portion projects from the outer pin portion.

11 Claims, 12 Drawing Sheets

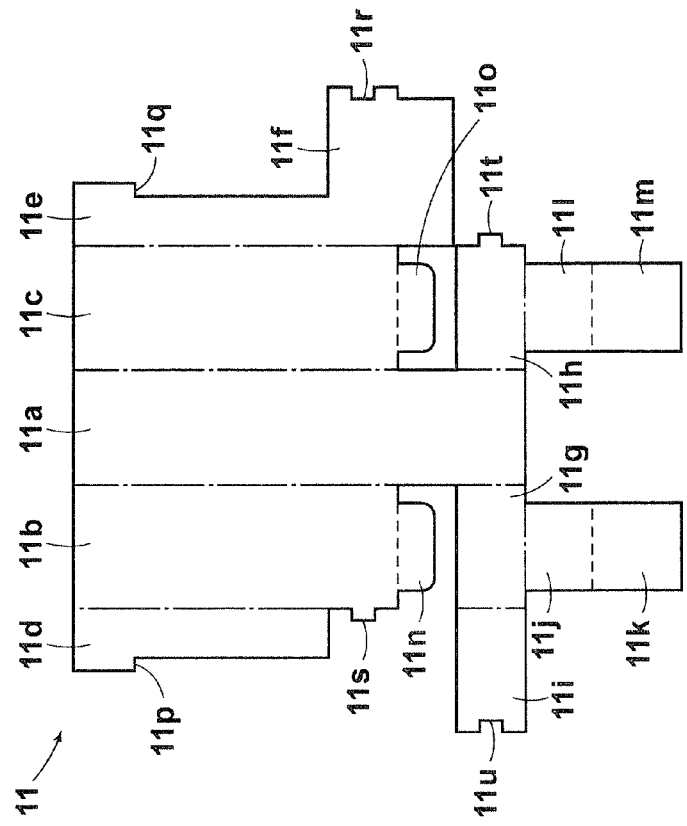
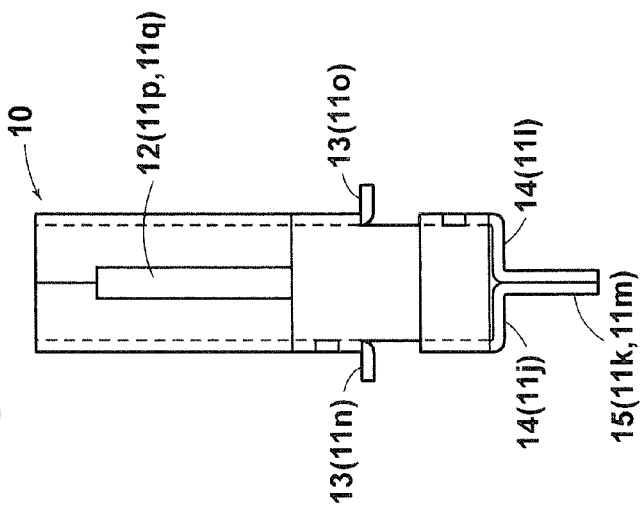
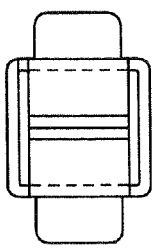

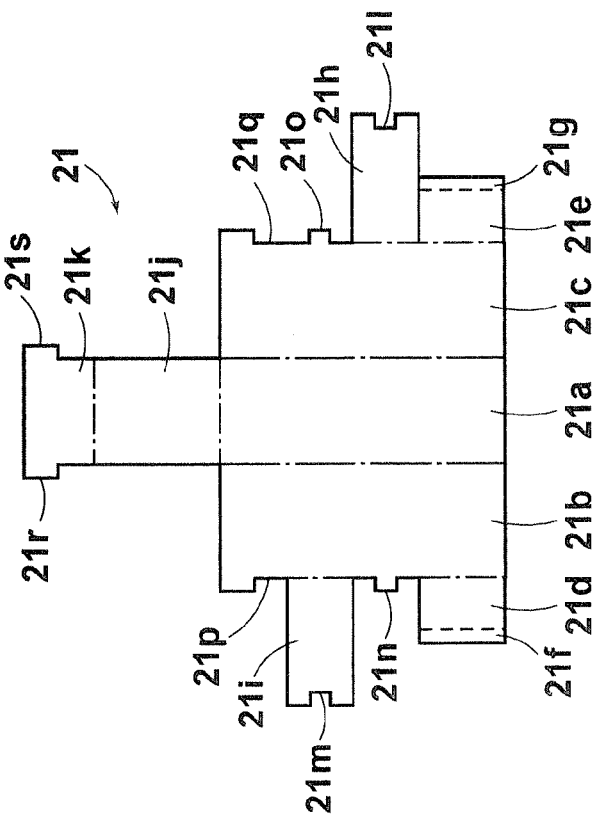
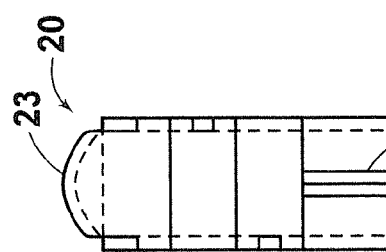
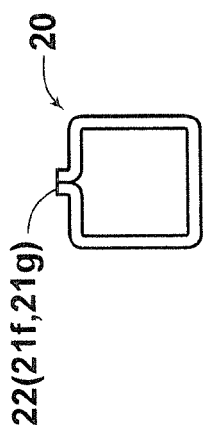

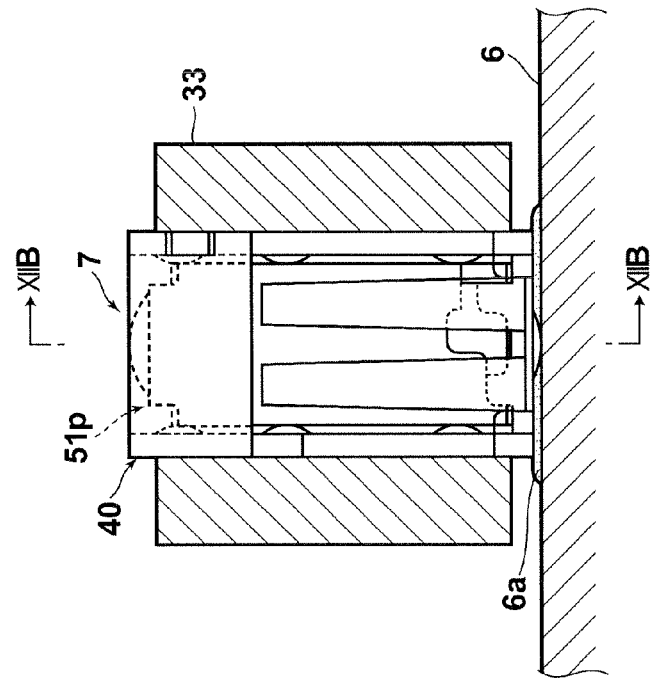
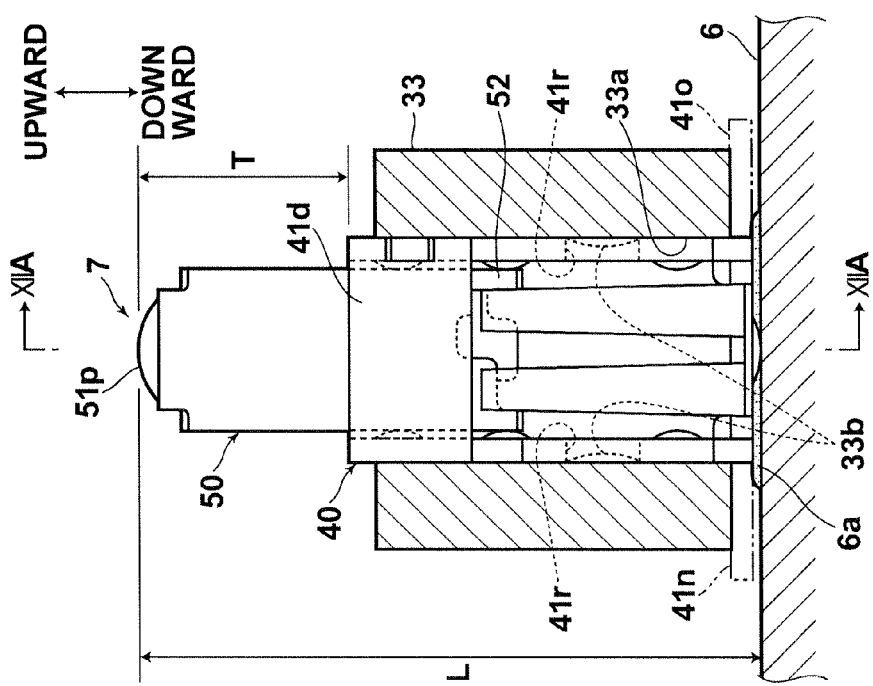
FIG.11A
FIG.11B

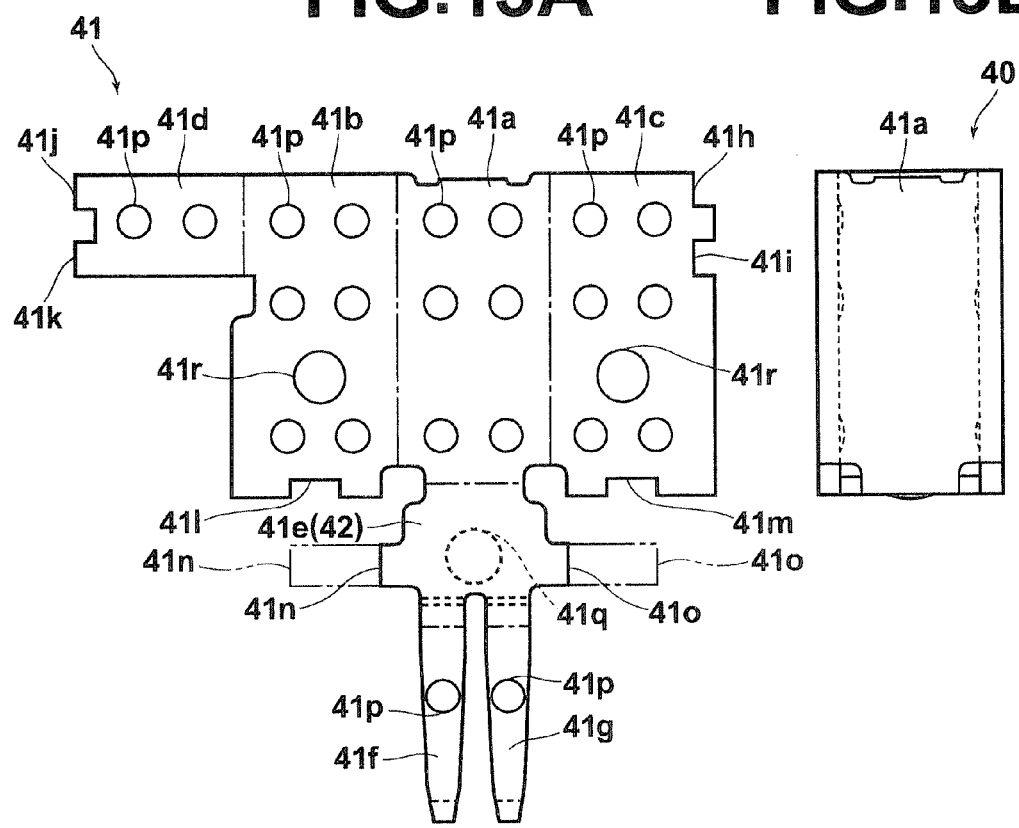

FIG.13F
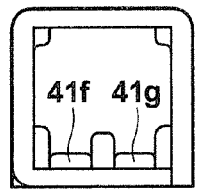
FIG.13D  FIG.13C  FIG.13E
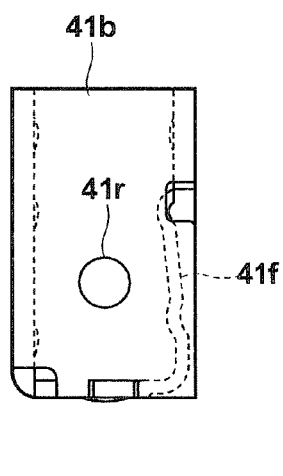 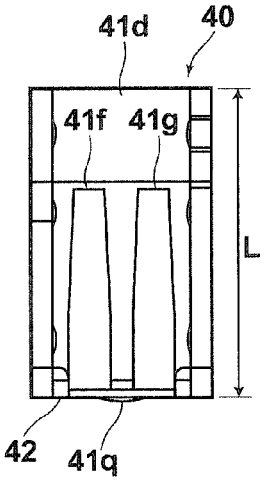 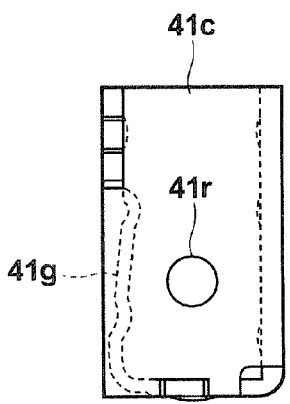
FIG.13G
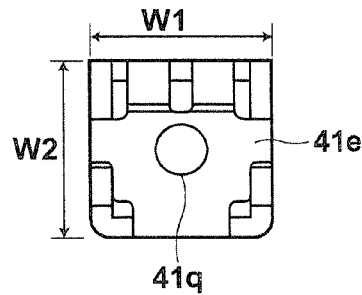

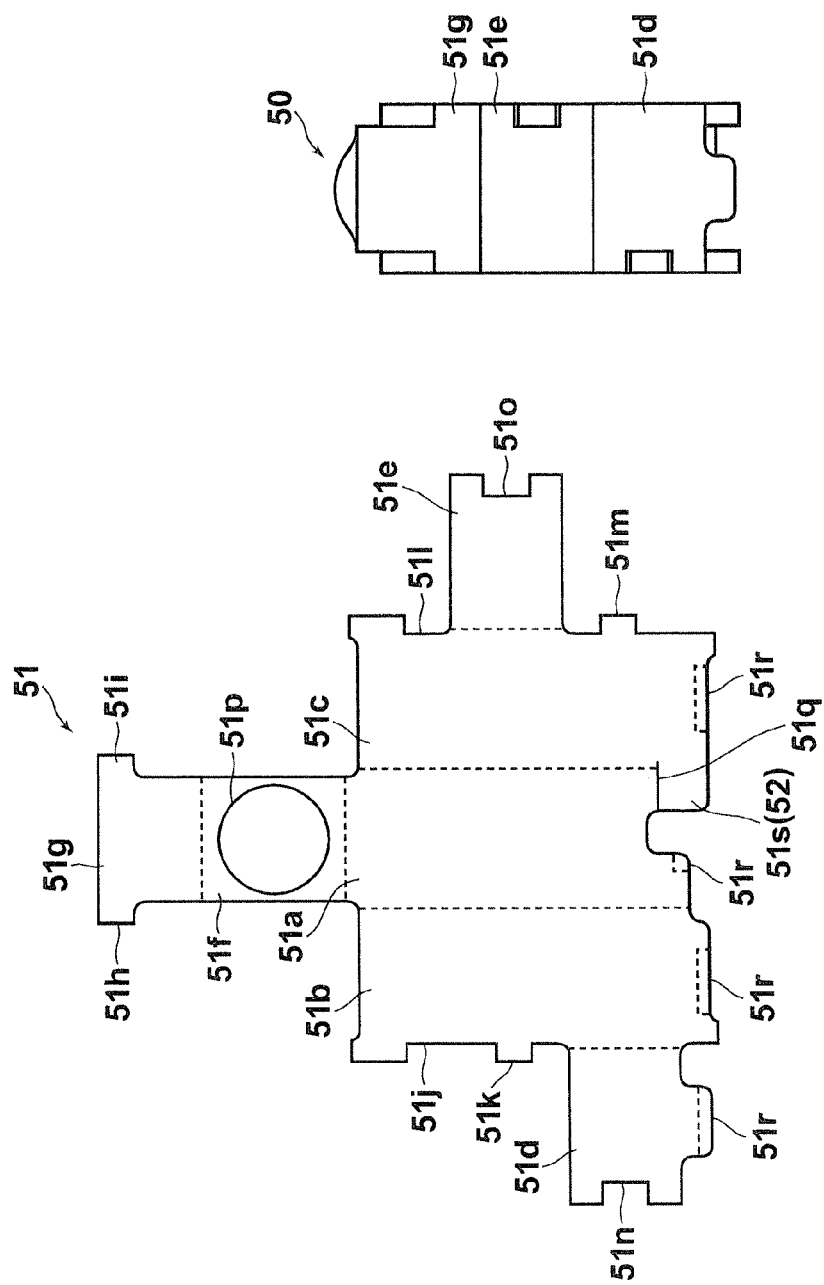

FIG.14F
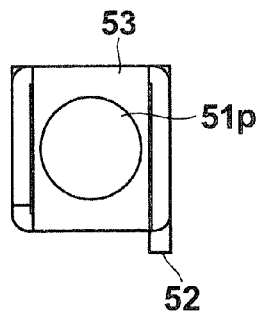
FIG.14D　　FIG.14C　　FIG.14E
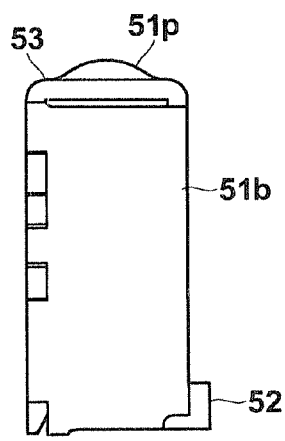 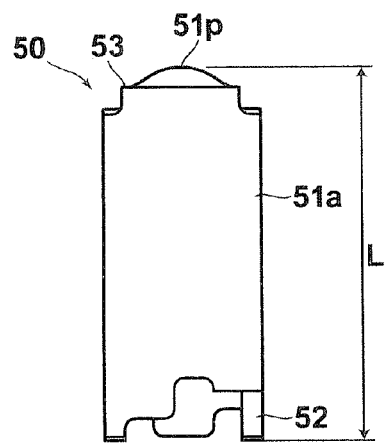 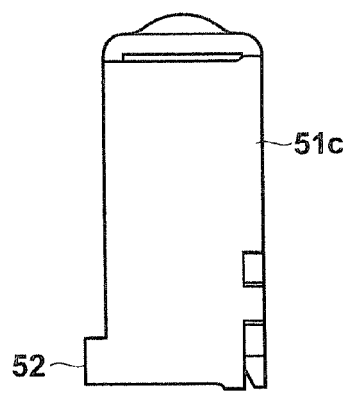
FIG.14G
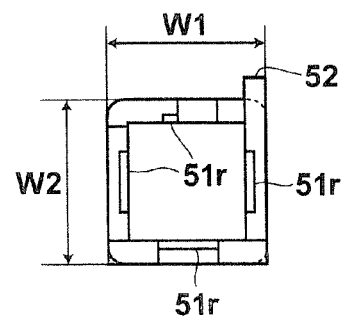

CONDUCTOR PIN

TECHNICAL FIELD

The present invention relates to a conductor pin, which is placed between two members to electrically connect the two members to allow conduction therebetween.

BACKGROUND ART

A conductor pin placed between two members to electrically connect the two members to allow conduction therebetween has been conventionally used in various fields or products. For example, various portable electronics devices, such as cellular phones, compact game machines, compact personal computers and PDAs, usually have a structure including a main body of the electronics device and a battery pack for supplying electric power to the main body. In this structure, electric power supply from the battery pack to the main body of the electronics device is carried out, for example, through the conductor pin placed between the battery pack and the main body.

As described in Japanese Unexamined Patent Application No. 2002-56831, for example, such conventional conductor pins are formed to be compressible using a spring. Generally known conductor pins that are formed to be compressible using a spring include, for example, one described in Japanese Unexamined Patent Application No. 2001-283806, which includes a hollow member, a contact slidably accommodated in the hollow member, and a spring for urging the contact housed in the hollow member outward from the hollow member. The contact is formed by a solid member, and the spring is generally formed to press the bottom surface of the contact.

Conductor pins of the type described above, such as one to be placed between the battery pack and the main body of a cellular phone, are required to have very small dimensions. However, conventional conductor pins as described above have difficulty in further size reduction because of their structure. Namely, the above-described conventional conductor pins have a contact formed by a solid member, and the bottom surface of the contact is urged by a spring. Therefore, the entire length of the conductor pin necessarily becomes, at the minimum, a total of the length of the fully compressed spring, a desired sliding distance of the contact (a length by which the conductor pin can be compressed) and the length of the contact, and further reduction of the entire length is impossible.

In order to solve the above-described problem, for example, the contact may be formed by a hollow member with a top panel, and the spring may be inserted in the contact to press the top panel thereof, to reduce the length of the conductor pin by the length of the prior art contact. However, a very small hollow member with a top panel is difficult to be produced, particularly it is difficult to provide dimensional accuracy to the hollow member with a top panel, through a conventional drawing process of a metal plate, which is typically used for producing such hollow members. Further, if the hollow member with a top panel forming the contact is, for example, plated with a metal, the hollow member cannot be produced using a metal plate plated with a metal in advance, since the metal plate is stretched through the drawing process (if a metal plate plated with a metal in advance is used, the metal plating on the stretched metal plate is cracked during the drawing process). On the other hand, if the hollow member with a top panel is plated after the drawing process, it is difficult to provide satisfactory plating on the inner surface of the hollow member because of the very small inner diameter of the hollow member with a top panel. Further, even if the plating could be carried out, the thickness of the plating on the inner surface cannot be measured.

In view of the above-described circumstances, the present invention is directed to provide a conductor pin that is suitable for use as a very small conductor pin used, for example, with cellular phones, has a size smaller than conventional conductor pins and can be produced easily.

DISCLOSURE OF INVENTION

The conductor pin according to the present invention is a conductor pin placed between one member and another member and contacting both of the members to electrically connect the members to each other, and the conductor pin comprises: a tubular outer pin portion formed by folding a conductive plate material for the outer pin portion; a tubular inner pin portion formed by folding a conductive plate material for the inner pin portion and inserted in the outer pin portion slidably in the axial direction of the outer pin portion; and a spring disposed in the outer pin portion and inserted in the inner pin portion to urge the inner pin portion in a direction in which the inner pin portion projects from the outer pin portion.

In the above-described conductor pin, the inner pin portion may comprise a top panel formed by folding the conductive plate material for the inner pin portion, the outer pin portion may comprise a bottom panel formed by folding the conductive plate material for the outer pin portion, and the spring may be disposed between the top panel of the inner pin portion and the bottom panel of the outer pin portion to urge the inner pin portion in the direction in which the inner pin portion projects from the outer pin portion.

In the above-described conductor pin, the outer pin portion may comprise a guide slit extending in the axial direction of the outer pin portion, the inner pin portion may comprise a guide body to be fitted in the guide slit, and the inner pin portion may be slidable with respect to the outer pin portion only within a range where the guide body is movable within the guide slit.

In the above-described conductor pin, one of the outer pin portion and the inner pin portion may comprise elastic pressure strips for pressing against a side surface of the other pin portion, and the elastic pressure strips may elastically press against the side surface of the other pin portion to electrically connect the outer pin portion and the inner pin portion to each other.

In the above-described conductor pin, the elastic pressure strips may be formed by folding the conductive plate material for the outer pin portion or the conductive plate material for the inner pin portion.

In the above-described conductor pin, the outer pin portion may be fixed to the one member.

In the above-described conductor pin, the outer pin portion may be fitted in a through hole formed in a holder and soldered to the one member via the bottom panel, and in this case, the bottom panel may comprise projecting tabs projecting out from the holder.

In the above-described conductor pin, the conductive plate material for the outer pin portion and the conductive plate material for the inner pin portion may be plated with a metal.

In the above-described conductor pin, the one member may be a circuit board of a cellular phone and the other member may be a battery pack of the cellular phone, and the conductor pin may contact conductive terminal areas of the circuit board and conductive terminal areas of the battery pack to electrically connect the both terminal areas to each other.

"To electrically connect the one member and the other member to each other" herein means to electrically connect the one member or a part of the one member to the other member or a part of other member. That is, conduction may be allowed between the one member and the other member themselves, or between parts thereof. If conduction is allowed between a part of the one member and a part of the other member, the conductor pin contacts the parts of the one member and the other member to allow conduction therebetween. Electric connection is established via any of the inner pin portion, the outer pin portion and the spring, and in general, electric connection is established via the inner pin portion and the outer pin portion or via the inner pin portion, the outer pin portion and the spring.

When it is assumed that a direction in which the inner pin portion is urged with respect to the outer pin portion (a direction in which the inner pin portion projects) is the upward direction, and the opposite direction is the downward direction, one end of the spring is desirably anchored to the upper area, particularly the upper end of the inner pin portion with an appropriate means (for example, the one end of the spring abuts on the above-described top panel). The other end of the spring is desirably anchored to the lower area, particularly the lower end of the outer pin portion with an appropriate means (for example, the lower end of the spring abuts on the above-described bottom panel). However, the spring may not necessarily be anchored to the outer pin portion, and may be anchored to (abut on) the one member to which the outer pin portion is fixed, for example.

As described above, since the conductor pin of the present invention uses as a contact the tubular inner pin portion, which is a hollow member unlike the conventional solid member, so that the spring is inserted in the tubular inner pin portion, the minimum length of the conductor pin that is necessary for ensuring a desired compressible length can be reduced from that in conventional conductor pins by the length of the contact (by the length of the portion of the spring inserted in the inner pin portion serving as the contact). Thus, a very small conductor pin, which is smaller than conventional conductor pins, can be obtained.

The tubular outer pin portion and the tubular inner pin portion are formed by folding the metal plate, not by drawing the metal plate. Therefore, the small tubular outer and inner pin portions can easily be produced. Particularly, using the tubular outer and inner pin portions having their inner and outer surfaces plated with a metal, a pin plated with the metal can be easily produced. This effect is particularly outstanding when a very small conductor pin is produced.

Further, when the outer pin portion includes the elastic pressure strips, and the elastic pressure strips forcedly contact and press against the inner pin portion due to their elasticity, the electric connection between the outer pin portion and the inner pin portion via the elastic pressure strips can be ensured, and electric resistance between the outer and inner pin portions can be reduced. Therefore, necessity of conduction between the pins via the inserted spring, for example, can be eliminated.

BRIEF DESCRIPTION OF DRAWINGS

FIG. 7A is a development view of a plate material for forming an outer pin portion of the first embodiment;

FIG. 7B is a front view of the outer pin portion of the first embodiment;

FIG. 7C is a bottom view of the outer pin portion of the first embodiment;

FIG. 8A is a development view of a plate material for forming an inner pin portion of the first embodiment;

FIG. 8B is a front view of the inner pin portion of the first embodiment;

FIG. 8C is a bottom view of the inner pin portion of the first embodiment;

FIG. 11A is a diagram illustrating a conductor pin of a second embodiment in the uncompressed state;

FIG. 11B is a diagram illustrating the conductor pin of the second embodiment in the compressed state;

FIG. 13A is a development view of a plate material for forming an outer pin portion of the second embodiment;

FIG. 13B is a rear elevation of the outer pin portion of the second embodiment;

FIG. 13C is a front view of the outer pin portion of the second embodiment;

FIG. 13D is a left side view of the outer pin portion of the second embodiment;

FIG. 13E is a right side view of the outer pin portion of the second embodiment;

FIG. 13F is a plan view of the outer pin portion of the second embodiment;

FIG. 13G is a bottom view of the outer pin portion of the second embodiment;

FIG. 14A is a development view of a plate material for forming an inner pin portion of the second embodiment;

FIG. 14B is a rear elevation of the inner pin portion of the second embodiment;

FIG. 14C is a front view of the inner pin portion of the second embodiment;

FIG. 14D is a left side view of the inner pin portion of the second embodiment;

FIG. 14E is a right side view of the inner pin portion of the second embodiment;

FIG. 14F is a plan view of the inner pin portion of the second embodiment; and

FIG. 14G is a bottom view of the inner pin portion of the second embodiment.

BEST MODE FOR CARRYING OUT THE INVENTION

Hereinafter, embodiments of the conductor pin according to the present invention will be described with reference to the drawings.

Figure 1:
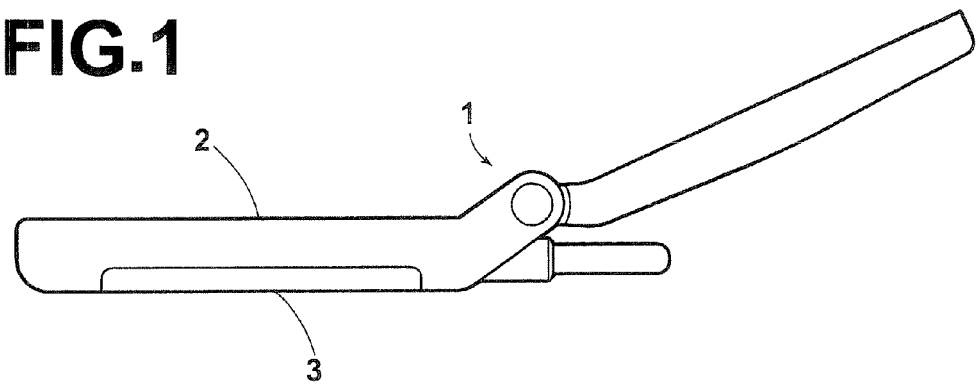
FIG. 1 is a side view illustrating a cellular phone provided with a conductor pin according to embodiments of the present invention.
Figure 2:
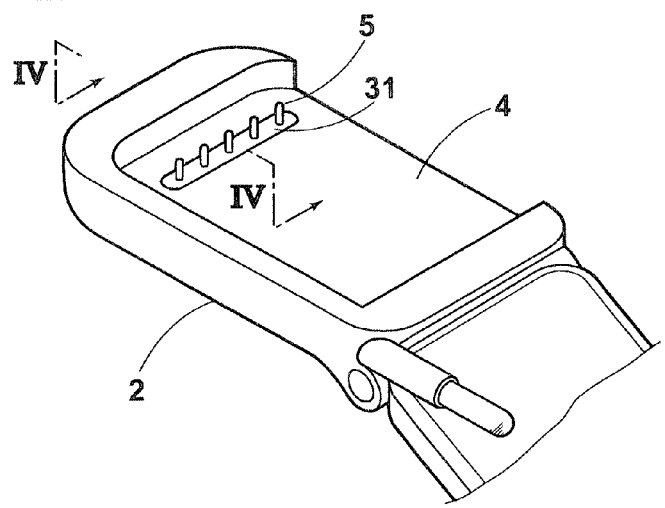
FIG. 2 is a perspective view illustrating a battery pack housing recess in a telephone body of the cellular phone shown in FIG. 1.
Figure 3:
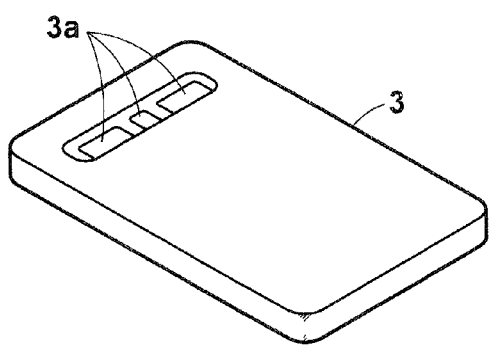
FIG. 3 is a perspective view illustrating a battery pack for the cellular phone shown in FIG. 1.

FIG. 1 is a side view illustrating a cellular phone employing a conductor pin according to a first embodiment of the present invention, FIG. 2 is a perspective view illustrating a battery pack housing recess in the telephone body of the cellular phone from which the battery pack has been removed, and FIG. 3 is a perspective view illustrating the battery pack.

A cellular phone 1 shown in the drawing includes a telephone body 2 and a battery pack 3 removably mounted in the telephone body 2. A battery pack housing recess 4 in the telephone body 2 has five conductor pins 5 projecting therefrom. The telephone body 2 contains a print circuit board 6 (see FIG. 4 explained later) on which various electronic parts are mounted. The conductor pins 5 are fixed to the circuit board 6 and are electrically connected to the circuit board 6, i.e., conductive terminal areas of a circuit pattern on the circuit board 6. The battery pack 3 is mounted in the battery pack housing recess 4 in the telephone body 2 shown in FIG. 2, with the upper side of the battery pack 3 as shown in FIG. 3 facing down. As the battery pack 3 is mounted in the telephone body 2, the upper ends of the conductor pins 5 contact conductive terminal areas 3a of the battery pack 3, thereby electrically connecting the conductive terminal areas of the print circuit board 6 (corresponding to the one member) to the conductive terminal areas 3a of the battery pack 3 (corresponding to the other member) to allow conduction therebetween so that electric power is supplied from the battery pack 3 to the print circuit board 6.

Figure 4:
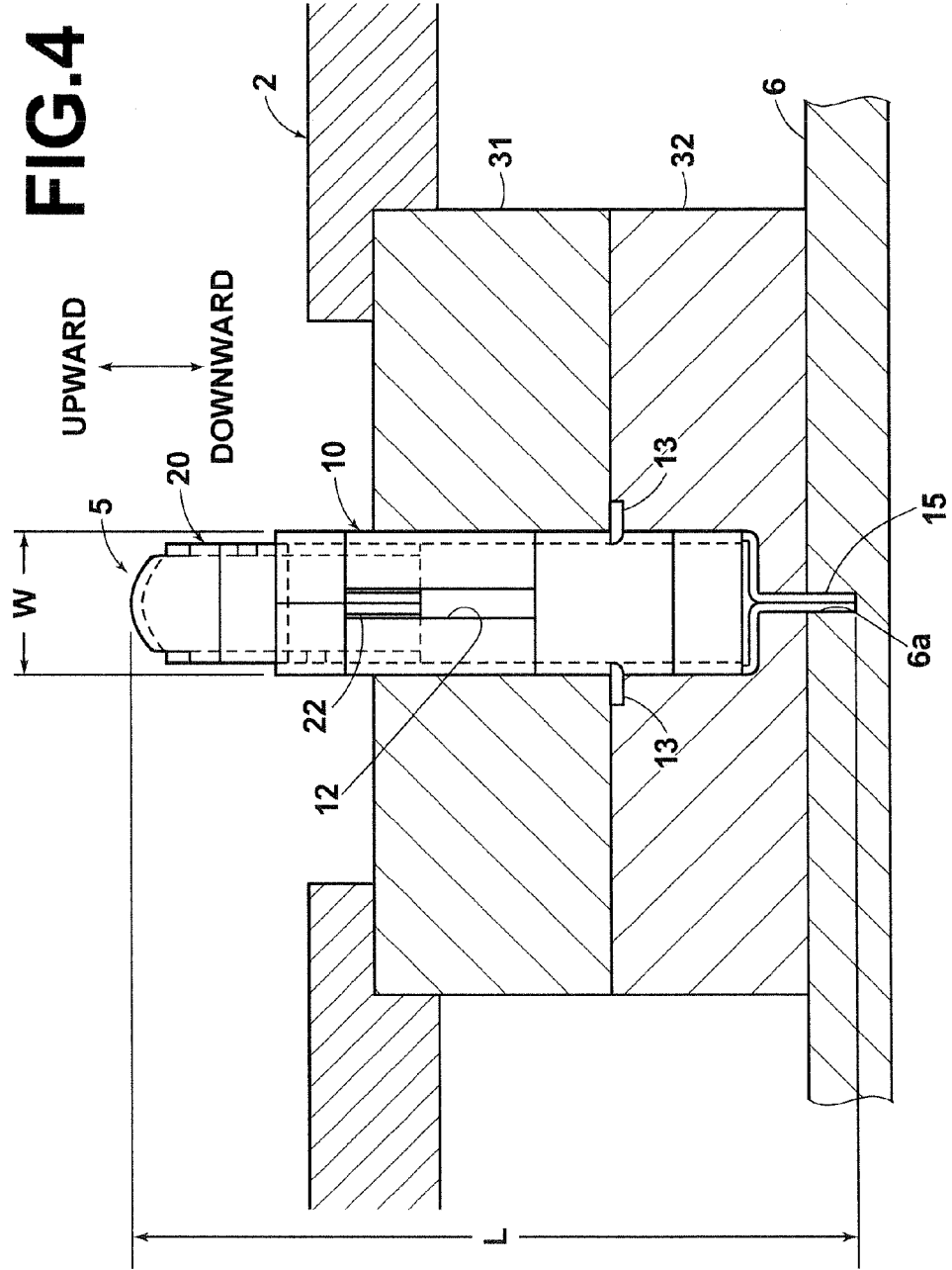
FIG. 4 is a diagram illustrating a conductor pin of a first embodiment in the uncompressed state.
Figure 5:
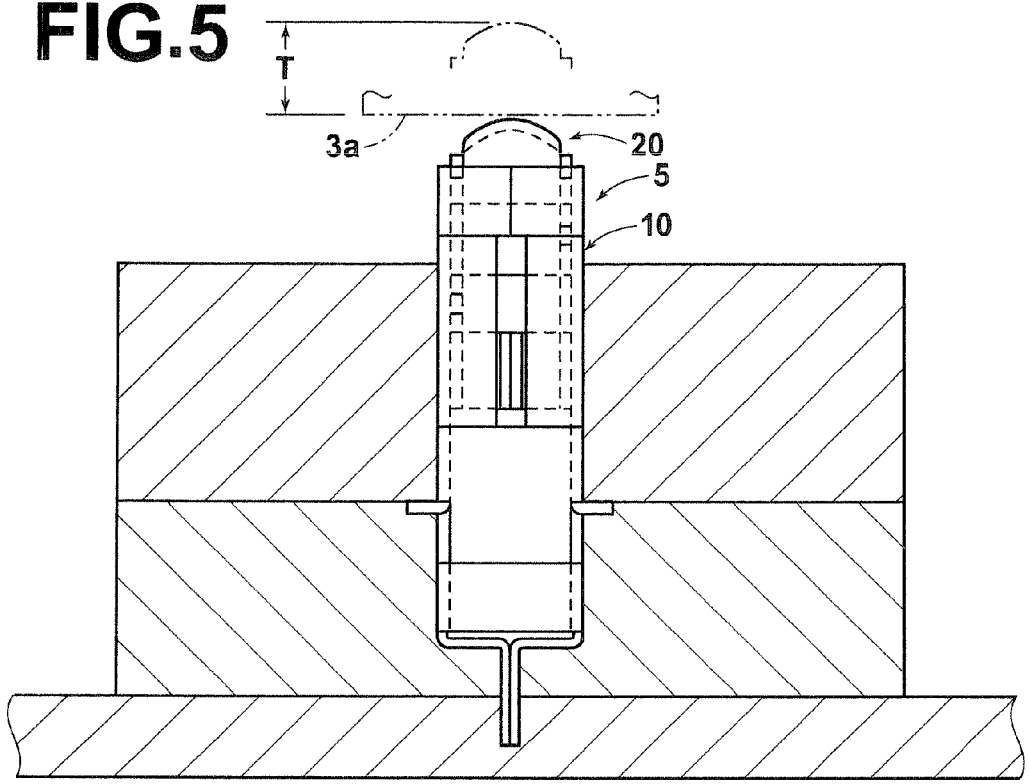
FIG. 5 is a diagram illustrating the conductor pin of the first embodiment in the compressed state.
Figure 6:
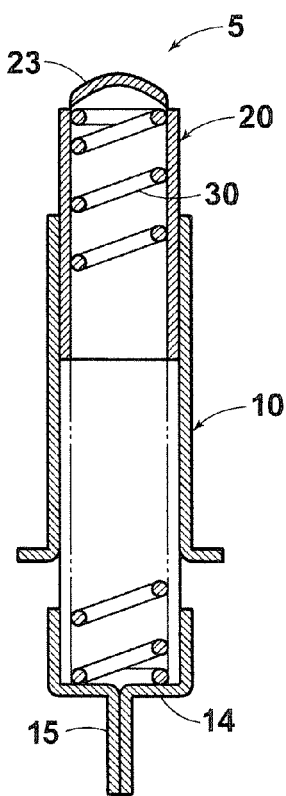
FIG. 6 is a sectional view of the conductor pin of the first embodiment.

FIGS. 4 and 5 are enlarged views illustrating the conductor pin 5 fixed to the circuit board 6. FIG. 4 illustrates the conductor pin 5 not contacting the battery pack 3 and in the uncompressed state. FIG. 5 illustrates the conductor pin 5 contacting the battery pack 3 and in the compressed state. Further, FIG. 6 is a sectional view of the conductor pin 5 shown in FIG. 4 in the uncompressed state.

As shown, the telephone body 2 contains the print circuit board 6 fixed thereto, on which various electronic parts are mounted. The lower portion of the conductor pin 5 is fixed to the circuit board 6, and the upper portion of the conductor pin 5 projects upward from the bottom of the battery pack housing recess 4 in the telephone body as shown in FIGS. 2 and 4.

The conductor pin 5 is formed by a tubular outer pin portion 10, a tubular inner pin portion 20 slidably inserted in the outer pin portion 10 in the axial direction of the outer pin portion, and a spring 30 inserted in both of the pins 10 and 20 and urging the inner pin portion 20 in a direction in which the inner pin portion 20 projects out from the outer pin portion 10.

It should be noted that, in this embodiment, "upper" or "upward" indicates a direction in which the inner pin portion 20 is urged by the spring 30 with respect to the outer pin portion 10 (projecting direction), and "lower" or "downward" indicates the opposite direction thereof.

The structure of the outer pin portion 10 is described with reference to FIG. 7A to FIG. 7C. FIG. 7A is a development view of a sheet of plate material 11 forming the outer pin portion 10, FIG. 7B is a front view of the outer pin portion 10 formed by folding the plate material 11, and FIG. 7C is a bottom view of the outer pin portion shown in FIG. 7B.

The outer pin portion 10 is formed by folding the sheet of conductive plate material 11 for the outer pin portion having the shape shown in FIG. 7A. The plate material 11 is a thin plate of a metal such as copper alloy, which is plated with gold (or a metal having good conductivity other than gold) on both sides thereof. The plate material 11 plated with gold is folded to form the outer pin portion. The front side of the plate material 11 as shown in FIG. 7A forms the inner surface of the tubular outer pin portion, and the back side thereof forms the outer surface of the tubular outer pin portion.

The plate material 11 includes a back panel portion 11a, an upper-left side panel portion 11b and an upper-right side panel portion 11c positioned at the left and right to the upper area of the back panel portion 11a, an upper-left half front panel portion 11d position at the left to the upper-left side panel portion 11b, an upper-right half front panel portion 11e and a mid front panel portion 11f positioned at the right to the upper-right side panel portion 11c, a lower-left side panel portion 11g and a lower-right side panel portion 11h back panel portion 11a positioned at the left and right to the lower area of the back panel portion 11a, a lower front panel portion 11i positioned at the left to the lower-left side panel portion 11g, a left-half bottom panel portion 11j positioned below the lower-left side panel portion 11g, a left leg portion 11k positioned below the left-half bottom panel portion 11j, a right-half bottom panel portion 11l positioned below the lower-right side panel portion 11h, a right leg portion 11m positioned below the right-half bottom panel portion 11l, and anchor tab portions 11n and 11o respectively positioned below the upper-left and upper-right side panel portions 11b and 11c.

The upper-left and upper-right side panel portions 11d and 11e respectively include cutouts 11p and 11q extending in the vertical direction (the axial direction of the outer pin portion 10). The mid front panel portion 11f includes an engaging depression 11r. The upper-left side panel portion 11b includes an engaging protrusion 11s at the lower area thereof. The lower-right side panel portion 11h includes an engaging protrusion 11t. The lower front panel portion 11i includes an engaging depression 11u.

The above-described plate material 11 is folded inward (so as to form "valleys") at right angle along the inward fold lines shown by the alternate long and short dash lines in the drawing, and is folded outward (so as to form "ridges") at right angle along outward fold lines shown by the dashed lines in the drawing. At this time, the engaging protrusion 11s is fitted in the engaging depression 11r, and the engaging protrusion 11t is fitted in the engaging depression 11u to engage them with each other to form the outer pin portion 10 shown in FIGS. 7B and 7C. As shown in the drawings, the outer pin portion 10 has a shape of a tube having a rectangular cross section and having the closed bottom and the open top. The outer pin portion 10 includes a guide slit 12 formed at the front side by the cutouts 11p and 11q, anchor tabs 13 projecting to the left and right formed by the anchor tab portions 11n and 11o, a bottom panel 14 formed by the left-half and right-half bottom panel portions 11j and 11l, and a leg portion 15 formed by abutting the left and right leg portions 11k and 11m on each other.

Next, the structure of the inner pin portion 20 is described with reference to FIGS. 8A to 8C. FIG. 8A is a development view of a sheet of plate material 21 forming the inner pin portion 20, FIG. 8B is a front view of the inner pin portion 20 formed by folding the plate material 21, and FIG. 8C is a bottom view of the inner pin portion shown in FIG. 8B.

The inner pin portion 20 is formed by folding the sheet of conductive plate material 21 for the inner pin portion having a shape as shown in FIG. 8A. The plate material 21 is a thin plate of a metal such as copper alloy, which is plated with gold (or a metal having good conductivity other than gold) on both sides thereof. The plate material 21 plated with gold is folded to form the inner pin portion. The front side of the plate material 21 as shown in FIG. 8A forms the inner surface of the inner pin portion, and the back side thereof forms the outer surface of the inner pin portion.

The plate material 21 includes a back panel portion 21a, a left side panel portion 21b and a right side panel portion 21c positioned respectively at the left and right to the back panel portion 21a, a lower-left half front panel portion 21d positioned at the left to the lower area of the left side panel portion 21b, a lower-right half front panel portion 21e positioned at the right to the lower area of the right side panel portion 21c, a left guide tab portion 21f positioned at the left to the lower-left half front panel portion 21d, right guide tab portion 21g positioned at the right to the lower-right half front panel portion 21e, a first middle front panel portion 21h positioned at the right to the right side panel portion 21c and just above the lower-right half front panel portion 21e and being separated from the lower-right half front panel portion 21e, a second middle front panel portion 21i positioned at the left to the left side panel portion 21b and above the first middle front panel portion 21h, a top panel portion 21j positioned above the back panel portion 21a, and an upper front panel portion 21k positioned above the top panel portion 21j.

The first middle front panel portion 21h and the second middle front panel portion 21i respectively include engaging depressions 21l and 21m. The left and right side panel portions 21b and 21c respectively include engaging protrusions 21n and 21o and engaging depressions 21p and 21q. The upper front panel portion 21k includes engaging protrusions 21r and 21s.

In the above-described plate material 21, the top panel portion 21j is rammed to project in a substantially semispherical form toward the back side of the plane of FIG. 8A. Then, the plate material 21 is folded inward at right angle along the inward fold lines shown by the alternate long and short dash lines in the drawing, and is folded outward at right angle along outward fold lines shown by the dashed lines in the drawing. At this time, the engaging protrusion 21n is fitted in the engaging depression 21l, the engaging protrusion 21o is fitted in the engaging depression 21m, and the engaging protrusions 21r and 21s are respectively fitted in the engaging depressions 21p and 21q to engage them with each other to form the inner pin portion 20 shown in FIGS. 8B and 8C. As shown in the drawings, inner pin portion 20 has a shape of a tube having a rectangular cross section and having the closed top and the open bottom. The inner pin portion 20 includes a guide body 22 formed by the left and right guide tab portions 21f and 21g abutted on each other, and a top panel 23 projecting upward in a substantially semispherical form from the top panel portion 21j.

The conductor pin 5 is assembled in the following manner: the guide body 22 of the inner pin portion 20 is fitted in the guide slit 12 of the outer pin portion to fit the inner pin portion 20 in the outer pin portion 10 so as to be able to slide along the vertical direction (the axial direction of the outer pin portion). Then, as shown in FIG. 6, a conductive spring 30 made of a metal such as spring steel is disposed in the outer pin portion 10 and is inserted in the inner pin portion 10. The upper end of the spring 30 abuts on the top panel 23 of the inner pin portion, and the lower end of the spring 30 abuts on the bottom panel 14 of the outer pin portion, thereby urging the inner pin portion 20 upward with respect to the outer pin portion 10. In this state, the upper end of the guide body 22 abuts on the upper end of the guide slit 12 and therefore the inner pin portion 10 does not move further upward. When the inner pin portion 10 is pushed down from above, the inner pin portion 10 compresses the spring 30 and can be moved down (compressed) until the lower end of the guide body 22 abuts on the lower end of the guide slit 12.

The assembly of the conductor pin 5 is achieved in the following manner, for example. First, the plate material 21 is folded to form the inner pin portion 20. Then, the inner pin portion 20 is placed on the plate material 11 such that the back panel portion 21a of the inner pin portion is positioned on the back panel portion 11a of the plate material 11, and thereafter the left and right side panel portions 11b and 11c of the plate material 11 are folded inward to stand with respect to the back panel portion 11a, or alternatively, the left and right side panel portions 11b and 11c of the plate material 11 are folded inward to stand with respect to the back panel portion 11a, and thereafter the inner pin portion 20 is placed on the back panel portion 11a such that the back panel portion 21a of the inner pin portion 20 is positioned on the back panel portion 11a of the plate material 11.

Then, the spring 30 is inserted in the inner pin portion 20 and is positioned on the back panel portion 11a. Thereafter, the upper-left and upper-right half front panel portions 11d and 11e as well as the mid front panel portion 11f are folded to enclose the inner pin portion 20, and the guide body 22 of the inner pin portion is fitted in the guide slit 12 of the outer pin portion. Further, the left and right bottom panel portions 11j and 11l are folded to form the bottom panel 14, thereby enclosing the spring 30 therein.

The conductor pin 5 assembled as described above is fixed to the circuit board 6 in the following manner. As shown in FIG. 4, the conductor pin 5 is fixed to the upper holder 31 and the lower holder 32, which are formed by an insulating material, by sandwiching the anchor tabs 13 between the upper holder 31 and the lower holder 32, and then fixing the holders to each other. Then, the leg portion 15 projecting downward through the lower holder 32 is inserted in a leg portion insertion recess 6a (having the same size as the projecting leg portion) formed in the circuit board 6, with molten solder having been poured in the leg portion insertion recess 6a, thereby soldering the leg portion 15 to the leg portion insertion recess 6a. The lower holders 31 and 32 may be fixed to the circuit board 6, as necessary, using an appropriate method.

Figure 9A:
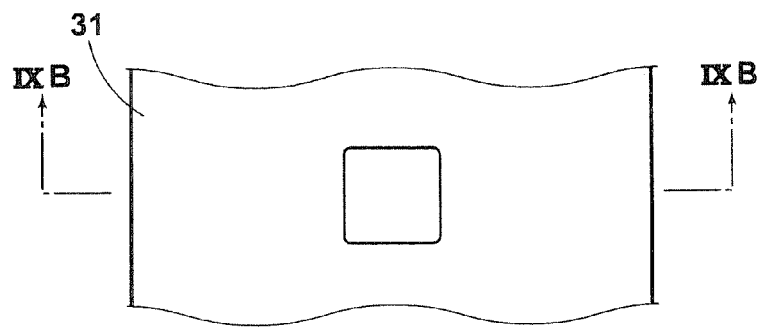
FIG. 9A is a plan view illustrating a part of an upper holder.
Figure 9B:
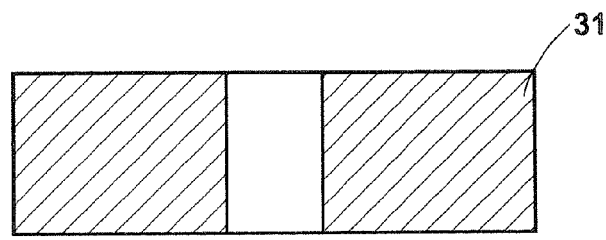
FIG. 9B is a sectional view taken along line IXB-IXB in FIG. 9A.
Figure 10A:
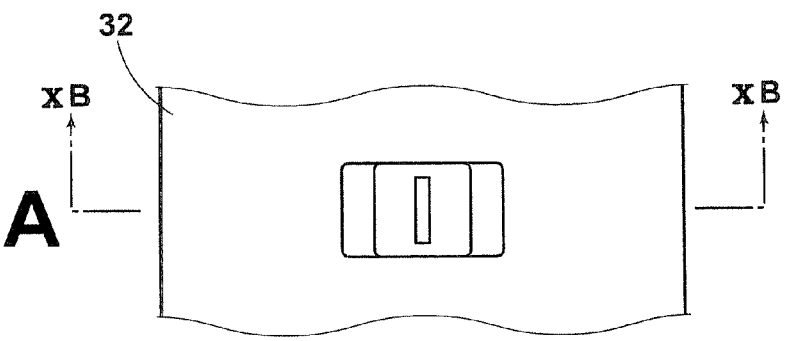
FIG. 10A is a plan view illustrating a part of a lower holder.
Figure 10B:
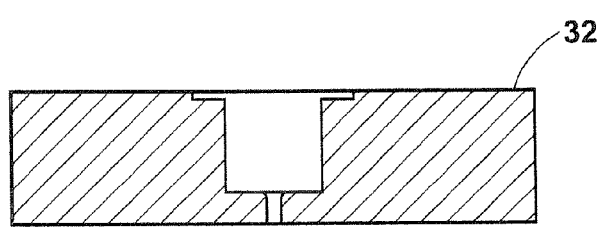
FIG. 10B is a sectional view taken along line XB-XB in FIG. 10A.

The upper holder and the lower holder are shown in FIGS. 9A, 9B, 10A and 10B. FIG. 9A is a plan view illustrating a part of the upper holder 31 and FIG. 9B is a sectional view of the upper holder 31 taken along line IXB-IXB in FIG. 9A. FIG. 10A is a plan view illustrating a part of the lower holder 32, and FIG. 10B is a sectional view of the lower holder 32 taken along line XB-XB in FIG. 1A.

The printed wiring of the circuit board is present in or in the vicinity of the leg portion insertion recess 6a of the circuit board. By inserting and soldering the leg portion 15 in and to the recess 6a, the leg portion 15, and in turn the conductor pin 5, is electrically connected to the printed wiring (the conductive terminal areas) of the circuit board 6 directly or via the solder.

The circuit board 6 having the conductor pins 5 attached thereto is thus contained in the telephone body 2. As shown in FIG. 2 or 4, the conductor pins 5 are exposed at the bottom of the battery pack housing recess 4. As the battery pack 3 is mounted in the battery pack housing recess 4 of the telephone body 2, the conductor pins 5 contact the conductive terminal areas 3a of the battery pack 3, and are pushed down by the conductive terminal areas 3a. When the battery pack 3 is completely mounted in the battery pack housing recess 4, the conductor pins 5 are compressed by a predetermined amount and contact the conductive terminal areas 3a of the battery pack with being urged by the reactive force of the spring 30.

Thus, the battery pack 3 is electrically connected to the circuit board 6 via the conductor pins 5 (the inner pin portions 10, the outer pin portions 2 and the springs 30) to allow conduction therebetween, and electric power is supplied from the battery pack 3 to the circuit board 6 via the conductor pins 5.

The conductor pin 5 of the above-described embodiment is a very small pin and has, in the uncompressed state shown in FIG. 4, the entire length L of 7.5 mm and the width W of 1.4 mm. A difference between the entire length of the conductor pin 5 in the uncompressed state shown in FIG. 4 and that in the compressed state (where the battery pack 3 is mounted and the conductive terminal areas 3a push down and compress the conductors pin 5) shown in FIG. 3, i.e., the amount of compression T is 1.0 mm. The plate thickness of the outer pin portion 10 and the inner pin portion 20 is 0.1 mm. The outer diameter of the spring 30 is 0.9 mm.

Next, a conductor pin according to a second embodiment of the present invention will be described.

Figure 12A:
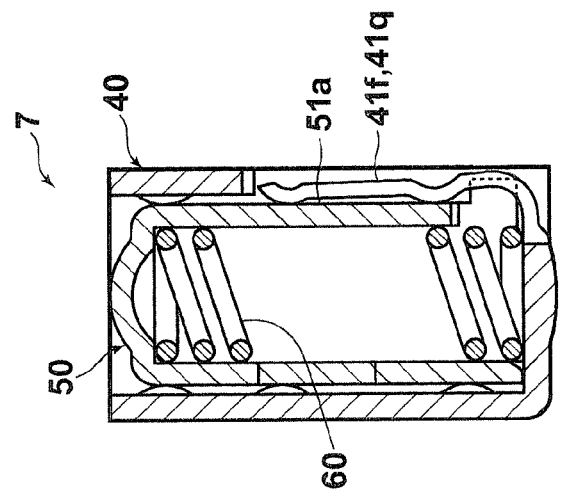
FIG. 12A is a sectional view taken along line XIIA-XIIA in FIG. 11A.
Figure 12B:
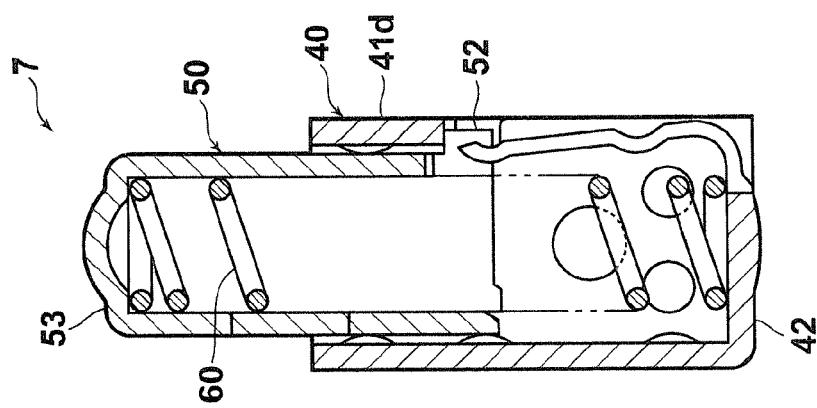
FIG. 12B is a sectional view taken along line XIIB-XIIB in FIG. 11B.

FIGS. 11A and 11B illustrate the conductor pin according to the second embodiment the present invention. FIG. 11A illustrates the uncompressed state thereof and FIG. 11B illustrates the compressed state thereof. Further, FIGS. 12A and 12B illustrate sectional views taken along line XIIA-XIIA in FIG. 11A and line XIIB-XIIB in FIG. 11B, respectively.

Similarly to the conductor pin 5 of the first embodiment, a conductor pin 7 of the present embodiment is used for allowing conduction between the battery pack 3 and the print circuit board 6 of a cellular phone. The bottom side of the conductor pin 7 is fixed to the print circuit board 6 to be electrically connected to the circuit board 6, i.e., to the conductive terminal areas of the circuit pattern on the circuit board 6, and the upper side of the conductor pin 7 contacts the conductive terminal areas of the battery pack 3 of the cellular phone, thereby electrically connecting the circuit board 6 to the battery pack 3 and allowing conduction therebetween.

The conductor pin 7 is formed by a tubular outer pin portion 40, a tubular inner pin portion 50 slidably inserted in the outer pin portion 40 in the axial direction of the outer pin portion, and a spring 60 inserted in both of the pins 40 and 50 and urging the inner pin portion 50 in a direction in which the inner pin portion 50 projects out from the outer pin portion 40.

In this embodiment, similarly to the previous embodiment, "upper" or "upward" indicates a direction in which the inner pin portion 50 is urged by the spring 60 with respect to the outer pin portion 40 (projecting direction), and "lower" or "downward" indicates the opposite direction thereof.

The structure of the outer pin portion 40 is described with reference to FIGS. 13A to 13G. FIG. 13A is a development view of a sheet of plate material 41 forming the outer pin portion 40. FIGS. 13B to 13G illustrate outer pin portion 40 formed by folding the plate material 41. FIG. 13B is a rear elevation, FIG. 13C is a front view, FIG. 13D is a left side view, FIG. 13E is a right side view, FIG. 13F is a plan view corresponding to FIG. 13C, and FIG. 13G is a bottom view corresponding to FIG. 13C.

The outer pin portion 40 is formed by folding the sheet of conductive plate material 41 for the outer pin portion having the shape shown in FIG. 13A. The plate material 41 is a thin plate of a metal such as copper alloy, which is plated with gold (or a metal having good conductivity other than gold) on both sides thereof. The plate material 41 plated with gold is folded to form the outer pin portion. The front side of the plate material 41 as shown in FIG. 13A forms the inner surface of the tubular outer pin portion, and the back side thereof forms the outer surface of the tubular outer pin portion.

The plate material 41 includes a back panel portion 41a, a left side panel portion 41b and a right side panel portion 41c positioned respectively at the left and right to the back panel portion 41a, an upper front panel portion 41d positioned at the left to the left side panel portion 41b, a bottom panel portion 41e positioned below the back panel portion 41a, and a left-front elastic pressure strip 41f and a right-front elastic pressure strip 41g positioned below the bottom panel portion 41e.

The right side panel portion 41c includes engaging depressions 41h and 41i, and the upper front panel portion 41d includes engaging protrusions 41j and 41k. The left and right side panel portions 41b and 41c respectively include engaging depressions 41l and 41m formed at the lower ends thereof. The bottom panel portion 41e includes engaging protrusions 41n and 41o formed respectively at the left and right sides thereof.

Further, each of the back panel portion 41a and the left and right side panel portions 41b and 41c includes six circular projections 41p, the upper front panel portion 41d includes the two circular projections 41p, and each of the left-front and right-front elastic pressure strips 41f and 41g includes the one circular projection 41p. The circular projections 41p slightly project in a spherical form toward the front side with respect to the plane of the drawing, i.e., inwardly with respect to the formed tube. The bottom panel portion 41e includes a circular projection 41q that slightly projects toward the back side with respect to the plane of the drawing, i.e., outwardly with respect to the formed tube. Each of the left and right side panel portions 41b and 41c includes a circular through hole 41r. In the drawing, the projections 41p are shown with the reference numeral "41p" provided only to one of the projections 41p in each of the back panel portion 41a, the left and right side panel portions 41b and 41c and the upper front panel portion 41d, and the reference numeral is omitted for the other projections 41p.

In the above-described plate material 41, the left and right side panel portions 41b and 41c, the upper front panel portion 41d and the bottom panel portion 41e around the back panel portion 41a are folded inwardly at right angle along the inward fold lines shown by the alternate long and short dash line in the drawing. The left-front and right-front elastic pressure strips 41f and 41g are folded at an angle slightly larger than the right angle along the inward fold lines shown by the alternate long and short dash lines near the base end so that they are slightly tilted inward as shown by the dashed lines in FIGS. 13D and 13E. The tip areas of the left-front and right-front elastic pressure strip 41f and 41g are folded at an angle of about 30 degrees along the outward fold lines shown by the dashed lines. Then, the engaging protrusions 41j and 41k are fitted in and engaged with the engaging depressions 41h and 41i, and the engaging protrusions 41n and 41o are fitted in and engaged with the engaging depressions 41l and 41m. In this manner, the outer pin portion 40 shown in FIGS. 13B to 13G is formed.

The outer pin portion 40 has a shape of a tube having a rectangular cross section and having the closed bottom and the open top, including a bottom panel 42 formed by the bottom panel portion 41e.

Next, the structure of the inner pin portion 50 is described with reference to FIGS. 14A to 14G. FIG. 14A is a development view of a sheet of plate material 51 forming the inner pin portion 50, and FIGS. 14B to 14G illustrate the inner pin portion 50 formed by folding the plate material 51. FIG. 14B is a rear elevation, FIG. 14C is a front view, FIG. 14D is a left side view, FIG. 14E is a right side view, FIG. 14F is a plan view corresponding to FIG. 14C, and FIG. 14G is a bottom view corresponding to FIG. 14C.

The inner pin portion 50 is formed by folding the sheet of conductive plate material 51 for the inner pin portion having a shape as shown in FIG. 14A. The plate material 51 is a thin plate of a metal such as copper alloy, which is plated with gold (or a metal having good conductivity other than gold) on both sides thereof. The plate material 51 plated with gold is folded to form the inner pin portion. The front side of the plate material 51 as shown in FIG. 14A forms the outer surface of the inner pin portion, and the back side thereof forms the inner surface of the inner pin portion.

The plate material 51 includes a front panel portion 51a, a left side panel portion 51b and a right side panel portion 51c positioned respectively at the left and right to the front panel portion 51a, a lower-back panel portion 51d positioned at the left to the lower area of the left side panel portion 51b, a middle-back panel portion 51e positioned at the right to the middle area of the right side panel portion 51c, a top panel portion 51f positioned above the front panel portion 51a, and an upper-back panel portion 51g positioned above the top panel portion 51f.

The upper-back panel portion 51g includes engaging protrusions 51h and 51i at the left and right sides thereof. The left side panel portion 51b includes an engaging depression 51j and an engaging protrusion 51k. The right side panel portion 51c includes an engaging depression 51l and an engaging protrusion 51m. The lower-back panel portion 51d includes an engaging depression 51n. The middle-back panel portion 51e includes an engaging depression 51o. Further, the top panel portion 51f includes a circular projection 51p that is formed by ramming the top panel portion 51f to project in a spherical shape toward the front side with respect to the plane of FIG. 14A. The front panel portion 51a includes a cut 51q that extends from the lower-right area of the front panel portion 51a to the right side panel portion 51c. Each of the front panel portion 51a, the left and right side panel portions 51b and 51c and the lower-back panel portion 51d includes a chamfered portion 51r that is formed by chamfering the inner surface such that the plate thickness at the lower end area gradually decreases downward.

In the above-described plate material 51, each portion is folded outward at right angle along each of the outward fold lines shown by the dashed lines in the drawing. Then, the engaging protrusions 51h and 51i are fitted in and engaged with the engaging depressions 51j and 51l, the engaging protrusion 51k is fitted in and engaged with the engaging depression 51o, and the engaging protrusions 51m is fitted in and engaged with the engaging depression 51n. In this manner, the inner pin portion 50 shown in FIGS. 14B to 14G is formed.

The inner pin portion 50 has a shape of a tube having a rectangular cross section and having the closed top and the open bottom. The inner pin portion 50 includes the cut 51q, and when the inner pin portion 50 is formed, an area 51s below the cut 51q projects frontward from the front panel portion 51a to form a projecting tab 52. The inner pin portion 50 further includes a top panel 53 formed by the top panel portion 51f, and a projection 51p formed on the top panel 53, which project upward in a substantially semispherical form.

The conductor pin 7 of the present embodiment is assembled in the following manner: the inner pin portion 50 is placed in the outer pin portion 40 such that the back panel portions 51g, 51o and 51n of the inner pin portion face the back panel portion 41a of the outer pin portion, and the projecting tab 52 of the inner pin portion is fitted and positioned between the right side panel portion 41c and the right-front elastic pressure strip 41g of the outer pin portion, thereby fitting the inner pin portion 50 in the outer pin portion 40 slidably in the vertical direction (in the axial direction of the outer pin portion). Then, as shown in FIG. 12A, a conductive spring 60 made of a metal such as spring steel is disposed in the outer pin portion 40 and is inserted in the inner pin portion 50, such that the upper end of the spring 60 abuts on the top panel 53 of the inner pin portion and the lower end of the spring 60 abuts on the bottom panel 42 of the outer pin portion, thereby urging the inner pin portion 50 upward with respect to the outer pin portion 40. In this state, the upper end of the projecting tab 52 of the inner pin portion 50 abuts on the lower end of the upper front panel portion 41d of the outer pin portion and therefore the inner pin portion 50 does not move further upward. When the inner pin portion 50 is pushed down from above, the inner pin portion 50 compresses the spring 60 and can be moved down (compressed) until the lower end of the inner pin portion 50 abuts on the upper side of the bottom panel 42 of the outer pin portion.

The assembly of the conductor pin 7 is achieved in the following manner, for example. First, the plate material 51 is folded to form the inner pin portion 50. Then, the left and right side panel portions 41b and 41c of the plate material 41 is folded inward to stand with respect to the back panel portion 41a, and the bottom panel portion 41e is folded to form the bottom panel 42. Further, the left-front and right-front elastic pressure strips 41f and 41g are folded to form the semi-finished tubular outer pin portion. Subsequently, the spring 60 is inserted in the inner pin portion 50, and in this state, the inner pin portion 50 is fitted in the semi-finished outer pin portion such that the back panel portions 51g, 51o and 51n of the inner pin portion faces the back panel portion 41a of the outer pin portion. Thereafter, in a state where the projecting tab 52 of the inner pin portion is positioned between the right side panel portion 41c and the right-front elastic pressure strip 41g of the outer pin portion and below the upper front panel portion 41d of the outer pin portion, the upper front panel portion 41d is folded to enclose the inner pin portion 50 in the outer pin portion.

The conductor pin 7 assembled as described above is fitted in an attachment hole 33a of a holder 33 made of an insulating material, as shown in FIG. 11A, and the left and right side panel portions 41b and 41c of the outer pin portion are elastically deformed to fit the spherical protrusions 33b formed on the inner surface of the attachment hole 33a in the through holes 41r of the outer pin portion, to attach the conductor pin 7 to the holder 33. In this state, the lower side of the bottom panel 42 of the outer pin portion, which slightly projects downward from the holder 33, is pressed against molten solder 6a deposited on the upper side of the circuit board 6 to solder the bottom panel 42 of the outer pin portion to the upper side of the circuit board 6. The holder 33 may be fixed to the circuit board 6, as necessary, with an appropriate method. In this manner, the conductor pin 7 is fixed to the circuit board 6.

The area on the circuit board 6, to which the conductor pin 7 is soldered, has the printed wiring of the circuit board 6. By soldering the bottom panel 42 of the conductor pin to the area of the circuit board 6, the conductor pin 7 is electrically connected to the printed wiring (conductive terminal areas) of the circuit board 6 directly or via the solder.

The conductor pin 7 of the present embodiment is a very small pin. The total length L of the conductor pin 7 in the uncompressed state shown in FIG. 11A is 3.0 mm. A difference between the total length in the uncompressed state and that in the compressed state shown in FIG. 11B (when the battery pack 3 is mounted and the conductor pin 7 is pushed down by the conductive terminal areas 3a and is compressed), i.e., the amount of compression T of the conductor pin 7 is 1.0 mm. The plate thickness of the outer pin portion 40 is 0.12 mm. The cross sectional dimensions W1 and W2 of the outer pin portion 40 shown in FIG. 13G are both 1.1 mm. The height L of the outer pin portion 40 shown in FIG. 13C is 2.0 mm. The plate thickness of the inner pin portion 50 is 0.1 mm. The cross sectional dimensions W1 and W2 of the inner pin portion 50 shown in FIG. 14G are both 0.8 mm. The height L of the inner pin portion 50 shown in FIG. 14C is 1.86 mm. The outer diameter, the free length and the wire diameter of the spring 60 are 0.55 mm, 3.0 mm and 0.09 mm, respectively.

The contact between the conductor pin 7 of the present embodiment and the battery pack 3 and the thus allowed electric connection between the battery pack 3 and the circuit board 6 are the same as those in the first embodiment. However, in the present embodiment, particularly, the outer pin portion 40 is provided with the elastic pressure strips 41f and 41g, and the elasticity of the elastic pressure strips 41f and 41g forces the elastic pressure strips 41f and 41g to contact the outer side surface of the inner pin portion 50 (the outer surface of the inner pin portion 50 extending in the axial direction, i.e., the sliding direction). Therefore, reliable contact between the outer pin portion 40 and the inner pin portion 50 can be maintained, and this significantly reduces electric resistance. In this manner, good conduction can be achieved and, as a result, necessity of the conduction by the spring 60 can be eliminated.

It should be noted that, although in the present embodiment the elastic pressure strips are provided to the outer pin portion and elastically press against the outer side surface of the inner pin portion, the elastic pressure strips may be provided to the inner pin portion in the conductor pin of the present invention. In this case, for example, the conductive plate material for the inner pin portion includes the elastic pressure strips and is folded to form the elastic pressure strips, and the elastic pressure strips elastically press against the inner side surface of the outer pin portion.

Further, in the conductor pin 7 of the present embodiment, the multiple spherical projections 41p are discretely provided at the inner side surface of the outer pin portion such that the outer side surface of the inner pin portion 50 contacts the projections 41p. Therefore, when the inner pin portion 50 slides along the outer pin portion 40, surface-to-surface sliding contact between the outer pin portion 40 and the inner pin portion 50 can be avoided, thereby mitigating a frictional drag during the slide and reducing heat generated due to the friction.

Moreover, in the conductor pin 7 of the present embodiment, as shown in FIGS. 14A and 14G, the inner surface of the lower end area of the inner pin portion 50 is chamfered such that the plate thickness gradually decreases downward to form the chamfered portions 51r. The chamfered portions 51r serve to prevent the lower end area of the inner pin portion 50 from being caught by the spring 60 when the inner pin portion 50 slides in the vertical direction.

Furthermore, the conductor pin 7 of the present embodiment is of the surface-mounting type and the bottom panel 42 of the outer pin portion is placed on the molten solder 6a deposited on the circuit board 6 to be soldered thereto, as described above. Therefore, the leg portion 15 as in the first embodiment is not necessary, and the total length of the conductor pin is smaller than that of the previous embodiment by the length of the leg portion.

In addition, in the conductor pin 7 of the present embodiment, as shown by the alternate long and two short dashes lines in FIGS. 11A and 13A, the engaging protrusions 41n and 41o formed at the bottom panel portion 41e can be further extended to project outward from the holder 33 to form projecting tabs. By providing such projecting tabs 41n and 41o, the conductor pin 7 can be easily removed from the circuit board 6 even after the conductor pin 7 has been soldered to the circuit board 6 by bringing a soldering iron into contact with the projecting tabs 41n and 41o, which are projecting out from the holder 33, and applying heat from the soldering iron via the projecting tabs 41n and 41o to the solder 6a to melt the solder 6a.

Although the conductor pins 5 and 7 of the first and second embodiments are both dimensionally very small pins as described above, the conductor pin of the present invention is not necessarily limited to such very small pins. However, the effects of the present conductor pin described in the above "Disclosure of Invention" section are outstanding with a conductor pin having an inner pin portion with inside dimensions of 2 mm or less, for example, and are particularly outstanding with a conductor pin having an inner pin portion with inside dimensions of 1.5 mm or less.

In the conductor pin 5 or 7 of the first or second embodiment, the outer pin portion 10 or 40 is fixed to one of the two members to be electrically connected with each other, and the inner pin portion 20 or 50 abuts on the other of the two members. However, the inner pin portion 20 or 50 may be fixed to one of the two members and the outer pin portion 10 or 40 may abut on the other. Alternatively, the conductor pin 5 or 7 may be held in a predetermined holding member, and the inner pin portion 20 or 50 and the outer pin portion 10 or 40 may abut on the corresponding ones of the two members. Further, to fix the inner pin portion 20 or 50 or the outer pin portion 10 or 40 to either of the two members, various fixing methods other than that described in the embodiments may be used.

The conductor pins of the present invention are suitably applicable to establish electric connection between a telephone body and a battery pack of cellular phones, as well as portable compact electronics devices such as game machines and compact computers. However, their use is not particularly limited, and they are applicable to various intended end-usages, devices and machines. In addition, one of the members to be electrically connected to each other via the conductor pin of the invention is not necessarily a battery pack.

The invention claimed is:

1. A conductor pin for placing between one member, and another member and adapted to contact and electrically connect one member to the other, the conductor pin comprising:
   an outer pin portion;
   a hollow inner pin portion inserted in the outer pin portion and slidably in an axial direction in the outer pin portion;
   a spring disposed in the outer pin portion and inserted in the inner pin portion to urge the inner pin portion in a direction in which the inner pin portion projects from the outer pin portion; and
   an elastic pressure strip affixed to either one of the outer pin portion or the inner pin portion, said elastic pressure strip mechanically elastically pressing a side surface of the other of the outer pin portion or the inner pin portion to electrically connect the inner pin portion and the outer pin portion so that electric current through the spring is substantially suppressed.

2. The conductor pin as claimed in claim 1, wherein the inner pin portion is formed by folding a conductive plate material; the inner pin portion comprises a top panel formed by folding the conductive plate material for the inner pin portion,
   the outer pin portion comprises a bottom panel formed by folding the conductive plate material for the outer pin portion, and
   the spring is disposed between the top panel of the inner pin portion and the bottom panel of the outer pin portion to urge the inner pin portion in a direction in which the inner pin portion projects from the outer pin portion.

3. The conductor pin as claimed in claim 1, wherein the outer pin portion comprises a guide slit extending in the axial direction of the outer pin portion, the inner pin portion comprises a guide body fitted in the guide slit, and the inner pin portion is slidable with respect to the outer pin portion only within a range where the guide body is movable within the guide slit.

4. The conductor pin as claimed in claim 1, wherein the inner pin portion is formed by folding a conductive plate material; and the elastic pressure strip is formed by folding the conductive plate material for the outer pin portion or the conductive plate material for the inner pin portion.

5. The conductor pin as claimed in claim 1, wherein the outer pin portion is fixed to the one member.

6. The conductor pin as claimed in claim 1, wherein the outer pin portion is fitted in a through hole formed in a holder and soldered to the one member via the bottom panel, and the bottom panel comprises projecting tabs projecting out from the holder.

7. The conductor pin as claimed in claim 1, wherein the one member is a circuit board of a cellular phone, the other member is a battery pack of the cellular phone, and the conductor pin contacts conductive terminal areas of the circuit board and conductive terminal areas of the battery pack to electrically connect the both terminal areas to each other.

8. The conductor pin as claimed in claim 1, wherein each of the inner pin portion and the outer pin portion is formed by bending a conductive plate material into a shape having a rectangular cross section, and flat side surfaces.

9. The conductor pin as claimed in claim 1, wherein the elastic pressure strip extends from a bottom panel of the outer pin portion and is bent up so as to elastically press a side surface of the inner pin portion.

10. The conductor pin as claimed in claim 1, wherein an inner surface of the outer pin has a plurality of spherical projections, and an outside surface of the inner pin contacts the projections.

11. The conductor pin as claimed in claim 1, wherein the inner pin portion and the outer pin portion are formed by folding a conductive plate material plated with a metal prior to folding.

* * * * *